(12) United States Patent
Sugasaki

(10) Patent No.: US 8,873,080 B2
(45) Date of Patent: *Oct. 28, 2014

(54) IMAGE FORMING DEVICE GENERATING SCREENS FOR REMOTE AND LOCAL ACCESS, INFORMATION PROCESSING METHOD, AND COMPUTER-READABLE RECORDING MEDIUM

(71) Applicant: Daichi Sugasaki, Kanagawa (JP)

(72) Inventor: Daichi Sugasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,022

(22) Filed: Mar. 4, 2014

(65) Prior Publication Data
US 2014/0185076 A1   Jul. 3, 2014

Related U.S. Application Data

(63) Continuation of application No. 12/814,535, filed on Jun. 14, 2010, now Pat. No. 8,705,091.

(30) Foreign Application Priority Data

Jun. 25, 2009   (JP) ................................. 2009-150818

(51) Int. Cl.
*G06F 3/12*   (2006.01)
*H04N 1/00*   (2006.01)

(52) U.S. Cl.
CPC ............ *G06F 3/1253* (2013.01); *H04N 1/0096* (2013.01); *H04N 1/00503* (2013.01); *H04N 1/00278* (2013.01); *H04N 2201/0039* (2013.01); *G06F 3/1205* (2013.01); *H04N 1/00408* (2013.01); *H04N 2201/0046* (2013.01)
USPC ........................... 358/1.13; 358/1.9; 358/1.15

(58) Field of Classification Search
CPC ......................... G06K 15/00; G06F 3/00–3/12
USPC .................................................. 358/1.1–3.29
See application file for complete search history.

(56) References Cited

U.S. PATENT DOCUMENTS

2004/0255263 A1   12/2004   Ando
2005/0171950 A1*  8/2005   Dumitru et al. .................. 707/9
(Continued)

FOREIGN PATENT DOCUMENTS

CN    101330555 A    12/2008
JP    2005-065053    3/2005
(Continued)

OTHER PUBLICATIONS

Chinese Office Action dated Apr. 6, 2012.

*Primary Examiner* — Paul F Payer
*Assistant Examiner* — Marcellus Augustin
(74) *Attorney, Agent, or Firm* — IPUSA, PLLC

(57) ABSTRACT

In an image forming device including a processor unit, a first screen generating part generates a screen to be displayed on an operation panel and displays the screen on the operation panel. A second screen generating part generates screen data to be displayed on an information processing device and transmits the screen data to the information processing device. An application managing part selects, in response to a request of execution of an application, one of the first and second screen generating parts as a candidate for use of the application based on a source inputting the request. The first and second screen generating parts are configured to receive a request of generation of a screen using a common interface, and the application inputs through the common interface the request to the selected one of the first and second screen generating parts.

17 Claims, 10 Drawing Sheets

1238

| OPERATION PLACE IDENTIFIER | RUN UNIT IDENTIFIER |
|---|---|
|  |  |
|  |  |
|  |  |

(56) References Cited

U.S. PATENT DOCUMENTS

| | | | |
|---|---|---|---|
| 2006/0120616 A1* | 6/2006 | Kita | 382/254 |
| 2007/0124510 A1 | 5/2007 | Ando | |
| 2009/0066710 A1 | 3/2009 | Pathak | |
| 2009/0228962 A1 | 9/2009 | Pathak | |
| 2009/0303557 A1 | 12/2009 | Nishimura | |
| 2010/0131595 A1 | 5/2010 | Sugasaki | |

FOREIGN PATENT DOCUMENTS

| | | |
|---|---|---|
| JP | 2006-140898 | 6/2006 |
| JP | 2007-110689 | 4/2007 |

* cited by examiner

FIG.8

| PRINT JOB IDENTIFIER | EVENT NOTICE RECIPIENT IDENTIFIER |
|---|---|
| 001 | ....... |
|  |  |
|  |  |

1236

IMAGE FORMING DEVICE GENERATING SCREENS FOR REMOTE AND LOCAL ACCESS, INFORMATION PROCESSING METHOD, AND COMPUTER-READABLE RECORDING MEDIUM

CROSS-REFERENCE TO RELATED APPLICATIONS

This application is a continuation application filed under 35 U.S.C. 111(a) claiming the benefit under 35 U.S.C. 120 of U.S. patent application Ser. No. 12/814,535 filed on Jun. 14, 2010, which is based upon and claims the benefit of priority of the Japanese Priority Patent Application No. 2009-150818 filed on Jun. 25, 2009, the entire contents of which are incorporated herein by reference.

BACKGROUND OF THE INVENTION

1. Field of the Invention

This invention relates to an image forming device, an information processing method, and a computer-readable recording medium which are adapted to execute an application.

2. Description of the Related Art

Conventionally, operational instructions from a user have been input to image forming devices, such as printers, copiers, facsimiles, scanners, or multi-function peripherals, through an operation panel provided for the image forming device concerned. In recent years, however, with progress of network technology, providing a remote user interface for the image forming devices through a network is also possible. For example, see Japanese Laid-Open Patent Publication No. 2006-140898.

On the other hand, there is known an image forming device of a certain type, called a multi-function peripheral, which is provided with a platform on which an application program (which will be called an application) is executed, and an API (Application Programming Interface) provided by the platform is made public. For example, see Japanese Laid-Open Patent Publication No. 2007-110689. With the image forming device of this type, using the API enables a software vendor other than the manufacturer of the image forming device to develop a new application and install the new application in the image forming device.

For the above-described image forming device with the platform, it is desirable that various applications are developed and provided to the market. The fact that various applications developed and provided are available raises a commercial value of the image forming device.

For that purpose, easy development of an application on the platform of the above-described image forming device is needed. In other words, this development is needed to lighten the burdens of development of applications on respective software vendors as much as possible.

In recent years, some of applications on the image forming device are utilized from the network (or an external device outside the image forming device) remotely as well as from the operation panel of the image forming device locally. In such situations, it is not desirable that the way each application is executed on the platform is sensitive to the difference of the operation place or depends on whether the operation place is local or remote.

The difference of the operation place may cause the operation of the application to be sensitive to changes in the source of input information and the destination of output information (processing result). Moreover, the difference of the operation place may result in a significant change in the form of use by the users, which requires that the application be installed to absorb the change.

For example, when an application on the image forming device is utilized from the operation panel, the application may be installed by assuming that the number of users who access the application at a time is always one. On the other hand, when an application on the image forming device is utilized from the network, a number of users may utilize the application simultaneously, unless a limit number for the number of users who access the application via the network at a time is specified.

Specifically, while a user A uses an application A from the operation panel, a user B may use the application A from the network. Furthermore, a user C may use the application A from the network simultaneously. When the application A is used simultaneously by two or more users, it is required that each of the application A and other applications on the image forming device respectively performs processing which is not in conflict with applications being run by each of the users.

Japanese Laid-Open Patent Publication No. 2006-140898 discloses the technology directed to supporting the operating method of the image forming device remotely, and does not provide the teaching as to the simultaneous use of the application by multiple users. In the image forming device disclosed in Japanese Laid-Open Patent Publication No. 2006-140898, the user who operates the device on the operation panel locally, and the operator who guides the operation of the device remotely, perform one application (or a run unit of the application) in a shared manner. This is substantially the same as the form of use in which two users perform one application while consulting with each other using the operation panel.

SUMMARY OF THE INVENTION

In one aspect of the invention, the present disclosure provides an image forming device, an information processing method, and a computer-readable recording medium which are able to reduce the influences on the installation of the application by the difference of the operation place.

In an embodiment of the invention which solves or reduces one or more of the above-mentioned problems, the present disclosure provides an image forming device including a processor unit comprising: a first screen generating part to generate a screen to be displayed on an operation panel and display the screen on the operation panel; a second screen generating part to generate screen data to be displayed on an information processing device, connected to the image forming device via a network, and transmit the screen data to the information processing device; and an application managing part to select, in response to a request of execution of an application input from the operation panel or the information processing device, one of the first screen generating part and the second screen generating part as a candidate for use of the application based on a source inputting the request of execution of the application, wherein the first screen generating part and the second screen generating part are configured to receive a request of generation of a screen using a common interface, and the application inputs through the common interface the request of generation of the screen to the one of the first screen generating part and the second screen generating part selected by the application managing part.

Other objects, features and advantages of the present disclosure will be more apparent from the following detailed description when read in conjunction with the accompanying drawings.

BRIEF DESCRIPTION OF THE DRAWINGS

FIG. 8 is a diagram illustrating the composition of a print job identification table.

DETAILED DESCRIPTION OF THE PREFERRED EMBODIMENTS

A description will be given of embodiments of the invention with reference to the accompanying drawings.

Figure 1:
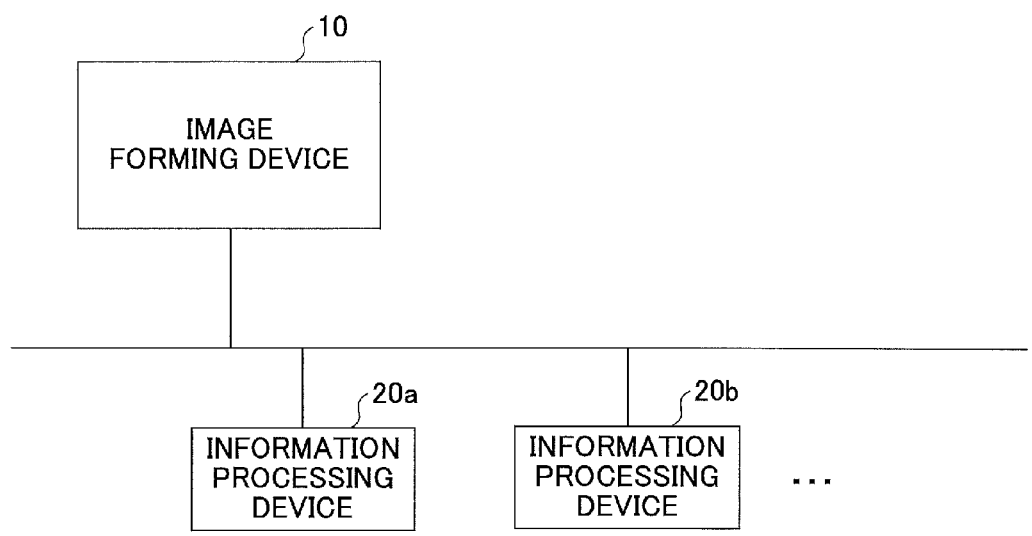
FIG. 1 is a diagram illustrating the composition of an image forming system to which an embodiment of the invention is applied.

FIG. 1 illustrates the composition of an image forming system to which an embodiment of the invention is applied. As illustrated in FIG. 1, in the image forming system, an image forming device 10 and information processing devices 20a and 20b are connected via a network (which is either a wired network or a wireless network), such as a LAN (local area network). Data communication between these devices via the network is possible.

The image forming device 10 is constituted by any of a printer, a scanner, a copier, a facsimile, or a multi-function peripheral. For the sake of convenience, it is assumed that the image forming device 10 of this embodiment is a multi-function peripheral.

The information processing device 20a or 20b (which will be collectively referred to as an information processing device 20 when they are not distinguished from each other) is constituted by any of a computer, such as a personal computer (PC), a portable terminal, such as a personal digital assistance (PDA), or a cellular phone.

In this embodiment, the information processing device 20 is capable of providing a user interface which is the same as a user interface on an operation panel of the image forming device 10.

Specifically, the information processing device 20 is arranged to display a screen which is the same as a screen displayed on the operation panel of the image forming device 10, and arranged to receive through the screen an operational instruction to the image forming device 10.

In the image forming system as illustrated in FIG. 1, two or more image forming devices 10 may be connected via the network. Moreover, in the image forming system as illustrated in FIG. 1, three or more information processing devices 20 may be connected via the network.

Figure 2:
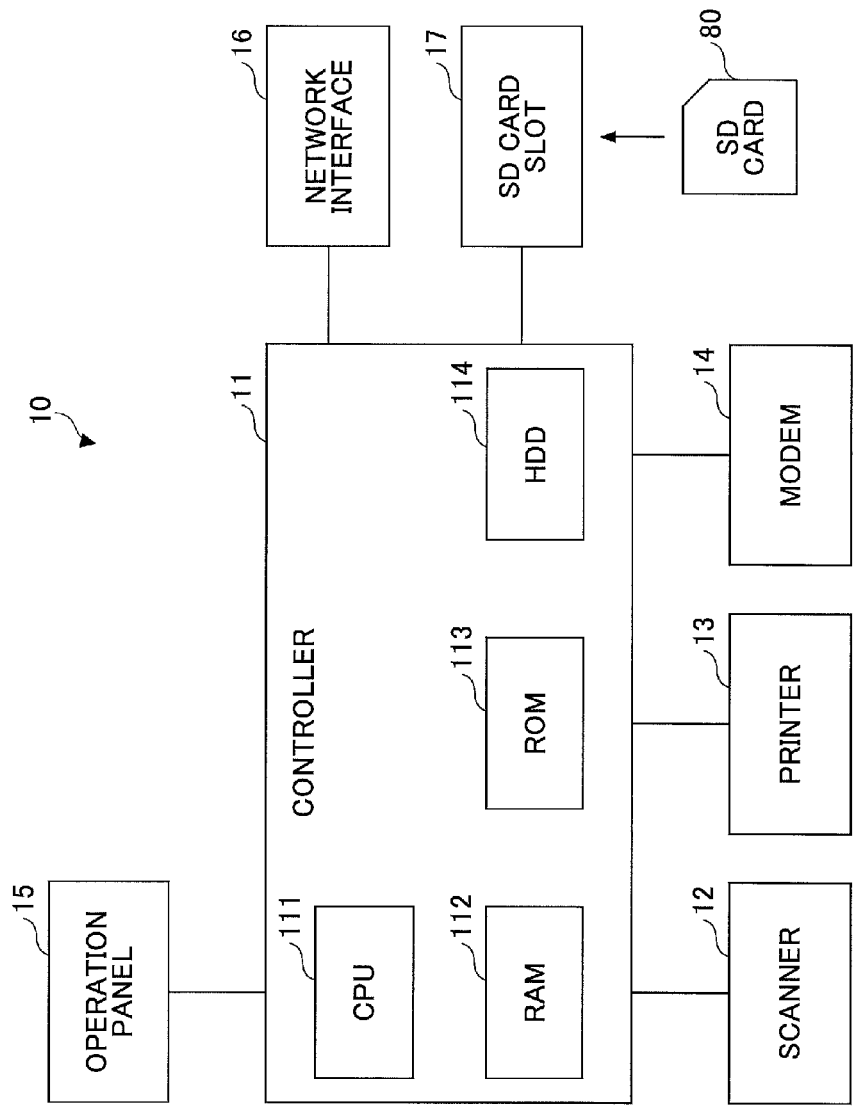
FIG. 2 is a diagram illustrating the hardware composition of an image forming device of an embodiment of the invention.

FIG. 2 illustrates the hardware composition of an image forming device 10 of an embodiment of the invention. As illustrated in FIG. 2, the hardware of the image forming device 10 includes a controller 11, a scanner 12, a printer 13, a modem 14, an operation panel 15, a network interface 16, and an SD (secure digital) card slot 17.

The controller 11 includes a CPU (central processing unit) 111, an RAM (random access memory) 112, a ROM (read-only memory) 113, and a HDD (hard disk drive) 114. In the ROM 113, various kinds of programs, and data or parameters used by the programs are stored. The RAM 112 is used as a storage area for loading a program, a work area of the loaded program, etc. The CPU 111 carries out various kinds of functions of the image forming device 10 by processing the programs read from the ROM 113 and loaded to the RAM 112. In the HDD 114, various kinds of programs, and data or parameters used by the programs are stored.

The scanner 12 is a hardware component for reading image data from an original document. The printer 13 is a hardware component for printing an image on a sheet. The modem 14 is a hardware component for connecting the image forming device 10 to a public telephone line, and the modem 14 is used to perform transmission/reception of image data based on the fax communication protocol.

The operation panel 15 is a hardware component which includes an input unit provided with buttons for receiving an input from a user, and a display unit, such as a liquid crystal panel. The network interface 16 is a hardware component for connecting the image forming device 10 to a network (which is either a wired network or a wireless network), such as a LAN. The SD card slot 17 is used to read a program stored in an SD card 80. Hence, the image forming device 10 is arranged so that not only the program read from the ROM 113 but also the program read from the SD card 80 may be loaded to the RAM 112 and executed thereon.

Figure 3:
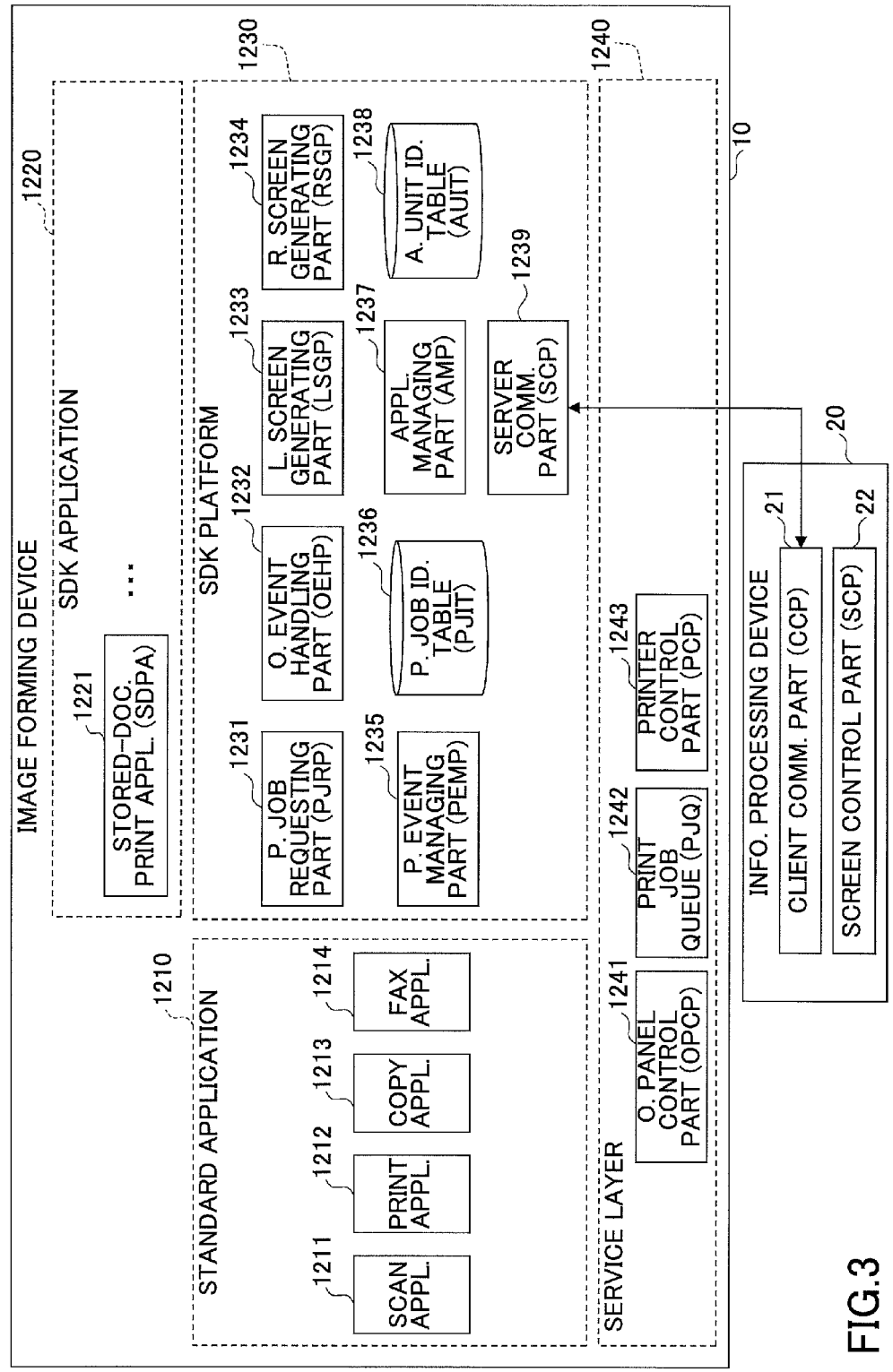
FIG. 3 is a diagram illustrating the software composition of an image forming device and an information processing device of an embodiment of the invention.

FIG. 3 illustrates the software composition of an image forming device and an information processing device of an embodiment of the invention.

As illustrated in FIG. 3, the software components of the image forming device 10 include a standard application 1210, an SDK application 1220, an SDK platform 1230, and a service layer 1240. SDK is an abbreviation for Software Development Kit.

The standard application 1210 includes a set of applications which are installed in the image forming device 10 beforehand (at the time of shipment of the image forming device 10). In the composition in FIG. 3, a scan application 1211, a print application 1212, a copy application 1213, and a fax application 1214 are illustrated as the standard application components. The scan application 1211 is configured to perform a scan job. The print application 1212 is configured to receive print data via the network and perform a print job based on the received print data. Hence, the print data transmitted to a print port of the image forming device 10 is processed by the print application 1212. The copy application 1213 is configured to perform a copy job. The fax application 1214 is configured to perform a fax transmitting job or a fax receiving job.

The service layer 1240 is a portion of the software of the image forming device 10 which provides an upper-layer application module with a function of managing management information or the like, and a function of control various kinds of hardware resources of the image forming device 10. As illustrated in FIG. 3, the service layer 1240 includes an operation panel control part (OPCP) 1241, a print job queue (PJQ) 1242, and a printer control part (PCP) 1243.

The operation panel control part 1241 displays a screen on the operation panel 15 (screen displaying). Moreover, the operation panel control part 1241 detects an input from the user (i.e., depression of a button) on the operation panel 15 and outputs an input event based on the detected input.

The print job queue 1242 receives entry of a print job (print data) from any of the software modules located above the service layer 1240 and holds a number of print jobs (the number: 0 to n) in the RAM 112 or the HDD 114 in an accumulated manner. The printer control part 1243 controls the printer 13 based on the print job held in the print job queue 1242, and performs printing of the print data on a print sheet. Moreover, the printer control part 1243 transmits to the print event managing part 1235 a notification of a progress or a result of execution of the print job with respect to the printer 13 (a normal end or abnormal end) as a print event.

Although a fax control part which controls the modem 14 to perform a fax transmission/reception of image data and a scanner control part which controls the scanner 12 to perform scanning of a document are also provided in the service layer 1240, illustration of these parts is omitted in order to provide good understanding of the case in which a print job is performed in this embodiment.

The SDK application 1220 is a plug-in application which is additionally installed in the image forming device 10 as an expansion option after shipment of the image forming device 10. In FIG. 3, a stored-document print application 1221 is illustrated as an example of the SDK application 1220.

The stored document print application 1221 is an SDK application 1220 which is configured to control a print job of image data stored or accumulated in the HDD 114 of the image forming device 10. For example, the image data is read from a document by the scanner 12 or received via the network, and stored in the HDD 114.

The SDK platform 1230 provides the execution environment of the SDK application 1220. In other words, the SDK application 1220 is an application which is executed on the SDK platform 1230. The SDK application 1220 is able to use (or perform) various kinds of functions of the image forming device 10 through an API (application programming interface) which is provided by the SDK platform 1230.

For example, the API (SDKAPI) includes the interface for allowing use of a scanning function, the interface for allowing use of a printing function, the interface for allowing use of a copying function, etc.

As illustrated in FIG. 3, the SDK platform 1230 includes a print-job requesting part (PJRP) 1231, an operation event handling part (OEHP) 1232, a local screen generating part (LSGP) 1233, a remote screen generating part (RSGP) 1234, a print event managing part (PEMP) 1235, a print job identification table (PJIT) 1236, an application managing part (AMP) 1237, an application unit identification table (AUIT) 1238, and a server communication part (SCP) 1239. Each of these parts of the SDK platform 1230 may be installed as a software component or may be installed as a class in object oriented programming. In the following, each part of the SDK platform 1230 may also be called a module.

Among these parts of the SDK platform 1230, the print job requesting part 1231, the operation event handling part 1232, and the local screen generating part 1233 (or the remote screen generating part 1234) are loaded on the basis of a unit (or a thread or a process) or an instance that starts execution of the stored-document print application 1221 (or the SDK application 1220) which performs a print job. In the following, the unit will be called a run unit. Therefore, the print job requesting part 1231, the operation event handling part 1232, and the local screen generating part 1233 (or the remote screen generating part 1234) which are loaded for a different run unit have a different internal state that varies depending on to the processing state of the SDK application 1220 which the part concerned belongs to.

The print job requesting part 1231 provides the SDKAPI for receiving a request of execution of a print job, to the SDK application 1220. The print job requesting part 1231 supplies (or inputs) the print job to the print event managing part 1235 in response to the request of execution of the print job received from the SDK application 1220. Moreover, the print job request part 1231 transmits a print event received from the print event managing part 1235, to the SDK application 1220.

The operation event handling part 1232 performs processing according to the operation event with respect to a screen (or an operation screen of the SDK application 1220) displayed on the operation panel 15 or the information processing device 20.

Each of the local screen generating part 1233 and the remote screen generating part 1234 provides the SDKAPI for generating a screen, to the SDK application 1220. The local screen generating part 1233 generates a screen data in the form supported by the operation panel 15, in response to a request of generation of a screen which is input through the SDKAPI. The remote screen generating part 1234 generates a screen data in the form supported by the screen control part 22 of the information processing device 20, in response to a request of generation of a screen which is input through the SDKAPI. The SDKAPI which is provided by the local screen generating part 1233 is the same as the SDKAPI which is provided by the remote screen generating part 1234. Therefore, the SDK application 1220 is able to use the local screen generating part 1233 and the remote screen generating part 1234 in the same manner.

The print event managing part 1235 inputs the print job received from the print job requesting part 1231, to the print job queue 1242. Moreover, the print event managing part 1235 receives the print event which is output from the printer control part 1243, and transmits a notification of reception of the print event to the print job requesting part 1231.

The print job identification table 1236 is a table in which an identifier of a print job and an identifier of a source requesting execution of the print job (the SDK application 1220) are associated with each other and registered. For example, the print job identification table 1236 is generated in the RAM 112 or the HDD 114. In the print job identification table 1236, the source requesting execution of the print job is distinguished on the basis of a run unit of the SDK application 1220, not on the basis of a kind (name) of the SDK application 1220. If the source is a different run unit of the stored-document print application 1221, it is treated as a different source. Hence, the SDK application 1220 in the image forming device 10 of this embodiment can be also used by the information processing device 20, and there is a possibility that execution of the SDK application 1221 of the same kind may be started a number of times simultaneously.

The print job identification table 1236 is used by the print event managing part 1235 to determine the destination to which a print event is reported. Hence, the address value (memory information address) of a function or a method for notification of a print event may be used as the identifier of the source requesting execution of the print job. In a case in which a print event is notified by using a predetermined communication protocol, an identifier according to the communication protocol (for example, a port number, a URL (Uniform Resource Locator), etc.) may be used as the identifier of the source requesting execution of the print job. In this embodiment, the function or the method notification of the print event is also installed in the print job requesting part 1231. As described above, the print job requesting part 1231 is loaded on the basis of a run unit of the SDK application 1220. Hence, the print job requesting part loaded to a different run unit has a different address value of the function.

The application managing part 1237 controls starting of execution of the SDK application 1220, and manages the state with respect to the started SDK application 1220.

The application unit identification table 1238 is a table in which an identifier of a run unit of the SDK application 1220 and an identifier of an operation place (user) are associated with each other and registered. For example, the application unit identification table 1238 is generated in the RAM 112 or the HDD 114. The application unit identification table 1238 is used to identify the recipient to which the screen data generated by the local screen generating part 1233 or the remote screen generating part 1234 in response to the request from the SDK application 1220 is to be transmitted. Moreover, the application unit identification table 1238 is used to identify the run unit of the destination to which an operation event with respect to the screen displayed based on the screen data is to be transmitted. The identifier of the operation place may be information that provides a distinction between the information processing device 20 and the operation panel 15. For example, an identifier of the information processing device 20 (for example, an IP address of the information processing device 20) and an identifier of the operation panel 15 (for example, an IP address of the image forming device 10 corresponding to the operation panel 15) may be used as the identifier of the operation place.

The server communication part 1239 controls the network communication. Fundamentally, the server communication part 1239 receives a request from the information processing device 20, and returns a response to the request back to the information processing device 20. In this embodiment, the request from the information processing device 20 is a request of acquisition of screen data or an operation event in the displayed screen, and the response to the information processing device 20 is the screen data.

In this embodiment, the information processing device 20 is not involved with the operating logic (a print job, etc.) to be performed in response to the input to the displayed screen. The information processing device 20 notifies the image forming device 10 of the content of an operation performed on the displayed screen as it is. Hence, if the screen data transmitted to the information processing device 20 is to display the screen that is the same as or equivalent to the screen displayed on the operation panel 15, the operation appearance on the information processing device 20 is the same as or equivalent to the operation appearance on the operation panel 15. A message for notification of an operation event that is asynchronous with the transmission of a request may be transmitted to the information processing device 20 through the server communication part 1239.

On the other hand, as illustrated in FIG. 3, the information processing device 20 includes a client communication part 21 and a screen control part 22. The client communication part 21 transmits a request to the image forming device 10, and receives a response from the image forming device 10. The screen control part 22 performs displaying of a screen based on a screen data contained in a request from the image forming device 10, and performs processing in accordance with an operation event input to the displayed screen. HTML (hypertext markup language) data may be used as an example of the screen data. When HTML data is used, the screen control part 22 and the client communication part 21 may be constituted by a web browser.

Next, the procedure performed by the image forming device 10 and the information processing device 20 will be described. First, the case in which the stored-document print application 1221 is used in parallel by different users through one information processing device 20a and the operation panel 15 of the image forming device 10 will be described.

Figure 4:
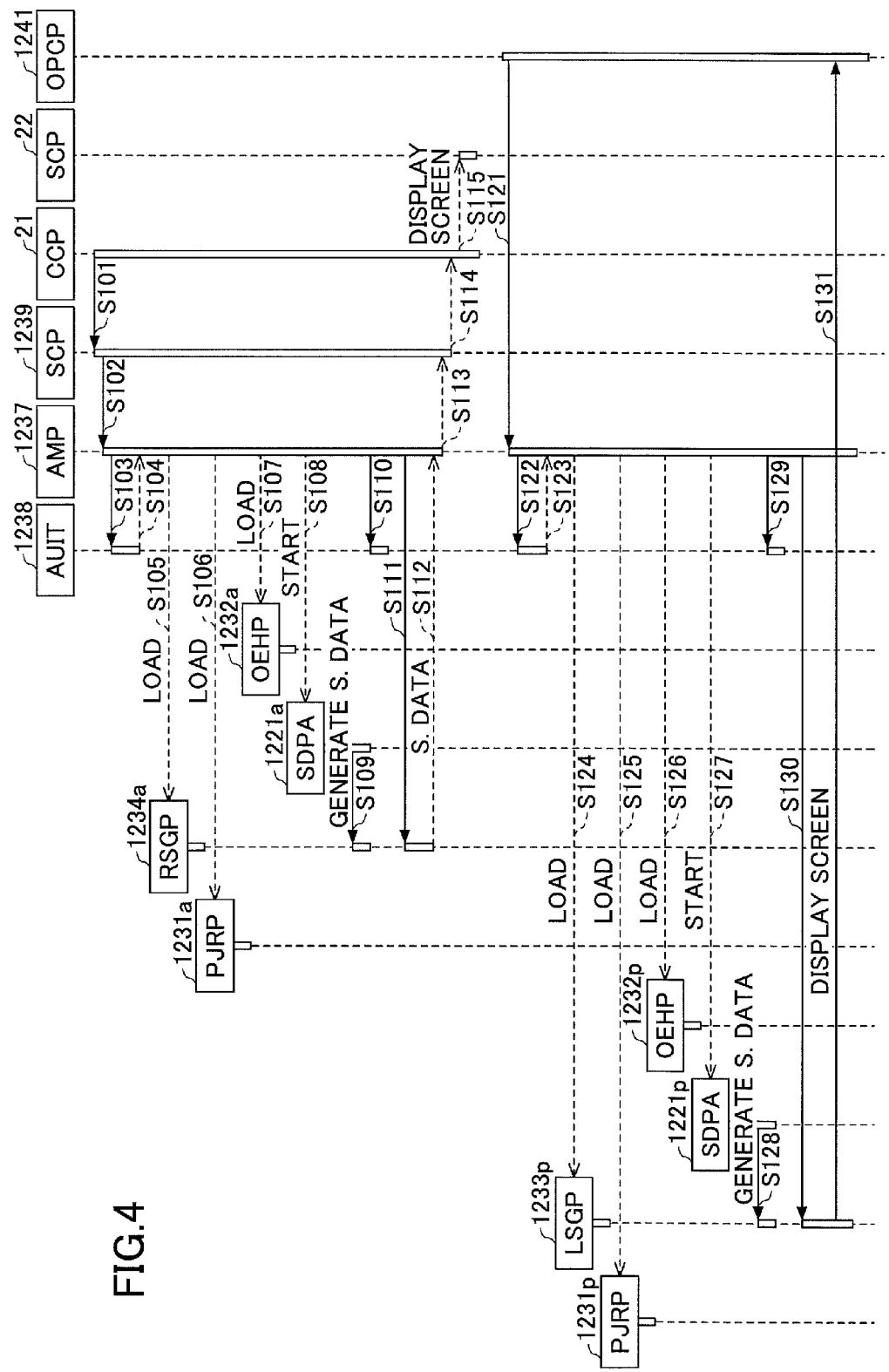
FIG. 4 is a sequence diagram for explaining the procedure performed by the image forming device when execution of a stored-document print application is started in parallel by an information processing device and an operation panel.

FIG. 4 is a sequence diagram for explaining the procedure performed by the image forming device when execution of the stored-document print application is started in parallel by the information processing device and the operation panel. In the procedure in FIG. 4, a user who uses the stored-document print application through the information processing device 20a will be called user A, and a user who uses the stored-document print application through the operation panel 15 of the image forming device 10 will be called user B.

In the information processing device 20a, a request of execution of the stored-document print application 1221 (use request) is input by the user A, and the client communication part 21 of the information processing device 20a transmits a request of acquisition of screen data of the stored-document print application 1221 to the image forming device 10 (S101). For example, the identifier (for example, an application ID) of the stored-document print application 1221 and the identifier (for example, an IP address) of the information processing device 20a are contained in the acquisition request of the screen data.

However, in the environment which is guaranteed that different users exist on the respective information processing devices 20, the identifier of the user A (for example, user name) may be contained in the acquisition request of the screen data, instead of the identifier of the information processing device 20a.

The acquisition request of the screen data is transmitted by clicking a button, corresponding to the stored-document print application 1221, in an application selection screen which is previously displayed prior to the step S101. The IP address of the image forming device 10 is beforehand stored in each information processing device 20.

If the acquisition request of the screen data of the stored-document print application 1221 is received, the server communication part 1239 of the image forming device 10 notifies the application managing part 1237 of reception of the acquisition request (S102). The application managing part 1237 acquires a run unit identification information corresponding to the identifier of the information processing device 20a contained in the acquisition request, from the application unit identification table 1238 (S103).

Figure 5:
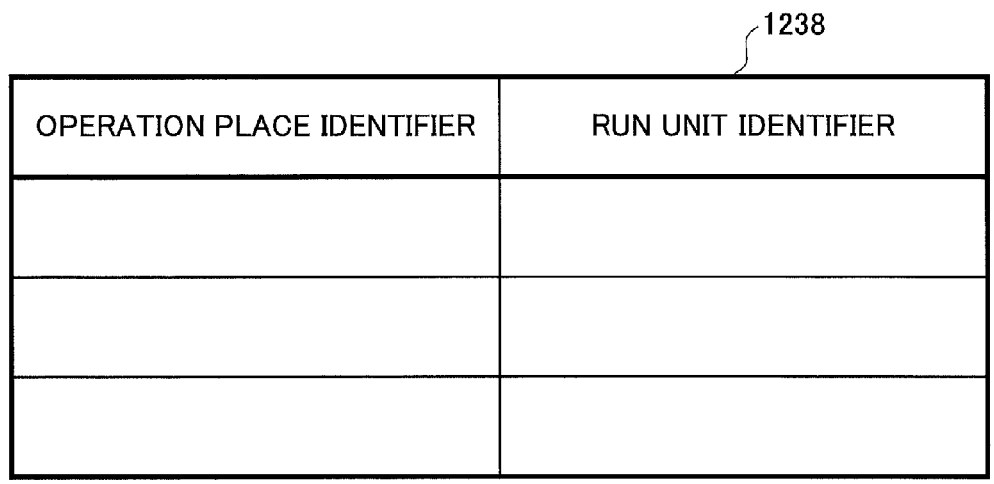
FIG. 5 is a diagram illustrating the composition of an application unit identification table.

FIG. 5 illustrates the composition of an application unit identification table 1238. As illustrated in FIG. 5, in the application unit identification table 1238, an operation place identifier and a run unit identifier are associated with each other and managed. The operation place identifier is identification information for identifying the operation place of the SDK application 1220 under execution. The run unit identifier is identification information for identifying each run unit of the SDK application 1220 uniquely. The run unit identifier may be identification information of any kind that can be accessed by the application managing part 1237 on the basis of a run unit of the SDK application 1220. For example, it may be the address information of each run unit on the memory, or may be an ID (thread ID or process ID) assigned to each run unit by the OS (operating system).

In the step S103, the application managing part 1237 acquires the run unit identifier corresponding to the operation place identifier which matches with the identifier of the information processing device 20a contained in the acquisition request of the screen data, from the application unit identification table 1238.

When the stored-document print application 1221 has not been performed yet through the operation of the information processing device 20a, the run unit identifier is not acquired (S104). In this case, the application managing part 1237 loads the modules which are needed for each run unit of the stored-document print application 1221, from among the modules contained in the SDK platform 1230.

In this embodiment, the application managing part 1237 loads the remote screen generating part 1234a, the print job requesting part 1231a, and the operation event handling part 1232a with respect to the run unit corresponding to the information processing device 20a (S105, S106, S107). The loading may be incorporated as generation of an object corresponding to each of the modules. The information as to which modules in the SDK platform 1230 are needed by each SDK application 1220 may be incorporated in the logic of the application managing part 1237, or may be described in an external file separate from the application managing part 1237. In such a case, the application managing part 1237 determines which modules are to be loaded based on the logic or the external file.

In this embodiment, there are two modules which generate screen data: the local screen generating part 1233 and the remote screen generating parts 1234. In the step S105, the application managing part 1237 loads the remote screen generating part 1234. This is because the source requesting acquisition of screen data is the information processing device 20a, not the operation panel 15. Namely, in the step S105, the application managing part 1237 selects the remote screen generating part 1234 as a candidate for being loaded, because the identification information of the information processing device 10a contained in the acquisition request of the screen data does not match with the identification information corresponding to the operation panel 15.

Alternatively, the application managing part 1237 may be arranged so that the acquisition request of the screen data in the step S102, and a request of displaying of a screen in step S111 (which will be described later) are received through different interfaces (functions or methods), and the candidate for being loaded (the local screen generating part 1233 or the remote screen generating part 1234) is determined based on the requesting source.

Subsequently, the application managing part 1237 starts execution of the stored-document print application 1221a which is a run unit corresponding to the information processing device 20a (S108). When execution of the stored-document print application 1221a is started, the application managing part 1237 supplies to the stored document print application 1221a the identification information of each of the remote screen generating part 1234a, the print job requesting part 1231a, and the operation event handling part 1232a loaded in the steps S105-S107, respectively. That is, the application managing part 1237 notifies the stored-document print application 1221a of use of the remote screen generating part 1234a, the print job requesting part 1231a, and the operation event handling part 1232a. The identification information of each part may be information of any kind which can be accessed by the stored-document print application 1221. For example, it may be the address information of each part loaded on the memory. The stored-document print application 1221a and each of the remote screen generating part 1234a, the print job requesting part 1231a and the operation event handling part 1232a are associated with each other in a bidirectional manner. Namely, it is possible for the stored-document print application 1221a to call the remote screen generating part 1234a, the print job requesting part 1231a and the operation event handling part 1232a, and it is possible for the remote screen generating part 1234a, the print job requesting part 1231a, and the operation event handling part 1232a to call the stored-document print application 1221a.

In the process of the starting processing, the stored-document print application 1221a generates a list of information of the screen data stored in the HDD 114, designates the generated list, and inputs a request of generation of an initial screen to the remote screen generating part 1234a the identification information of which is notified by the application managing part 1237 (S109). The remote screen generating part 1234 generates the screen data for displaying the initial screen including the list, and stores the screen data in the RAM 112.

When the starting processing of the stored-document print application 1221a is completed, the application managing part 1237 stores and registers the correspondence information of the identifier of the information processing device 20a and the identifier of the run unit of the stored-document print application 1221a in the application unit identification table 1238 (S110).

Subsequently, the application managing part 1237 transmits a request of acquisition of screen data to the remote screen generating part 1234a (S111). The remote screen generating part 1234a outputs the screen data stored in the RAM 112, to the application managing part 1237 (S112). The application managing part 1237 requests the server communication part 1239 to transmit the screen data to the information processing device 20a (S113).

The server communication part 1239 transmits the screen data to the client communication part 21 of the information processing device 20a (S114). The client communication part 21 inputs the received screen data to the screen control part 22 (S115). The screen control part 22 displays the initial screen of the stored-document print application 1221a based on the received screen data.

On the other hand, a request of execution of the stored-document print application 1221 (use request) is input by the user B through the operation panel 15 of the image forming device 10, and the operation panel control part 1241 inputs a request of displaying of an initial screen of the stored-document print application 1221 to the application managing part 1237 (S121). For example, the identifier (application ID) of the stored-document print application 1221 and the identifier of the operation panel 15 are contained in the displaying request.

Subsequently, the application managing part 1237 acquires the run unit identifier corresponding to the identifier of the operation panel 15 contained in the displaying request, from the application unit identification table 1238 (S122).

When the stored-document print application 1221 has not yet been performed through the operation of the operation panel 15, the run unit identifier is not acquired (S123). In this case, the application managing part 1237 loads the modules which are needed for each run unit of the stored-document print application 1221, from among the modules contained in the SDK platform 1230.

In this embodiment, the application managing part 1237 loads the local screen generating part 1233p, the print job requesting part 1231*p*, and the operation event handling part 1232*p* with respect to the run unit corresponding to the operation panel 15, (S124, S125, S126).

In the step S124, the application managing part 1237 selects the local screen generating part 1233*p* as a candidate for being loaded, because the source requesting the displaying of the screen is the operation panel 15, not the information processing device 20.

Subsequently, the application managing part 1237 starts execution of the stored-document print application 1221*p* which is a run unit corresponding to the operation panel 15 (S127). When execution of the stored-document print application 1221*p* is started, the application managing part 1237 supplies to the stored-document print application 1221*p* the identification information of each of the local screen generating part 1233*p*, the print job requesting part 1231*p*, and the operation event handling part 1232*p* loaded in the steps S124-S126, respectively. The stored-document print application 1221*p* and each of the local screen generating part 1233*p*, the print job requesting part 1231*p* and the operation event handling part 1232*p* are associated with each other in a bidirectional manner.

In the process of starting processing, the stored-document print application 1221*p* generates a list of information of the screen data stored in the HDD 114, designates the generated list, and inputs a request of generation of an initial screen to the local screen generating part 1233*p* the identification information of which is notified by the application managing part 1237 (S128). The local screen generating part 1233 generates the screen data for displaying the initial screen including the list, and stores the screen data in the RAM 112. The screen data generated is in conformity with the data format supported by the operation panel 15.

When the starting processing of the stored-document print application 1221*p* is completed, the application managing part 1237 stores and registers the correspondence information of the identifier of the operation panel 15 and the identifier of the run unit of the stored-document print application 1221*p* in the application unit identification table 1238 (S129).

Subsequently, the application managing part 1237 transmits a request of displaying of the screen to the local screen generating part 1233*p* (S130). The local screen generating part 1233*p* outputs the screen data stored in the RAM 112, to the operation panel control part 1241 (S131). The operation panel control part 1241 displays the initial screen of the stored-document print application 1221*p* on the operation panel 15 based on the received screen data (S131).

When the interface provided by the operation panel control part 1241 includes a set of drawing instructions (functions or methods) of various screen elements only and does not input the screen data, the local screen generating part 1233*p* merely inputs, in response to the screen displaying request received at step S130, the drawing instructions of the screen to be displayed, to the operation panel control part 1241 without generating screen data at the time of receiving the initial screen generating request at step S128.

As described above with respect to FIG. 4, in this embodiment, the difference of the operation place of the SDK application 1220 (the stored-document print application 1221) is absorbed by the SDK platform 1230. That is, a difference of an operation place is determined by the application managing part 1237, and either the remote screen generating part 1234 or the local screen generating part 1233 is supplied to the SDK application 1220 in accordance with a result of the determination.

In this case, the interface of the remote screen generating part 1234 and the interface of the local screen generating part 1233 are unified into a single interface. Therefore, the developer of the SDK application 1220 is able to install the SDK application 1220 without considering a difference between the case in which the application is operated through the information processing device 20 and the case in which the application is operated through the operation panel 15.

For the sake of convenience, the exemplary procedure in which the operation through the information processing device 20*a* and the operation through the operation panel 15 are performed in series or consecutively is illustrated in FIG. 4. Alternatively, the operation through the information processing device 20*a* and the operation through the operation panel 15 may be performed in parallel or simultaneously.

Figure 6:
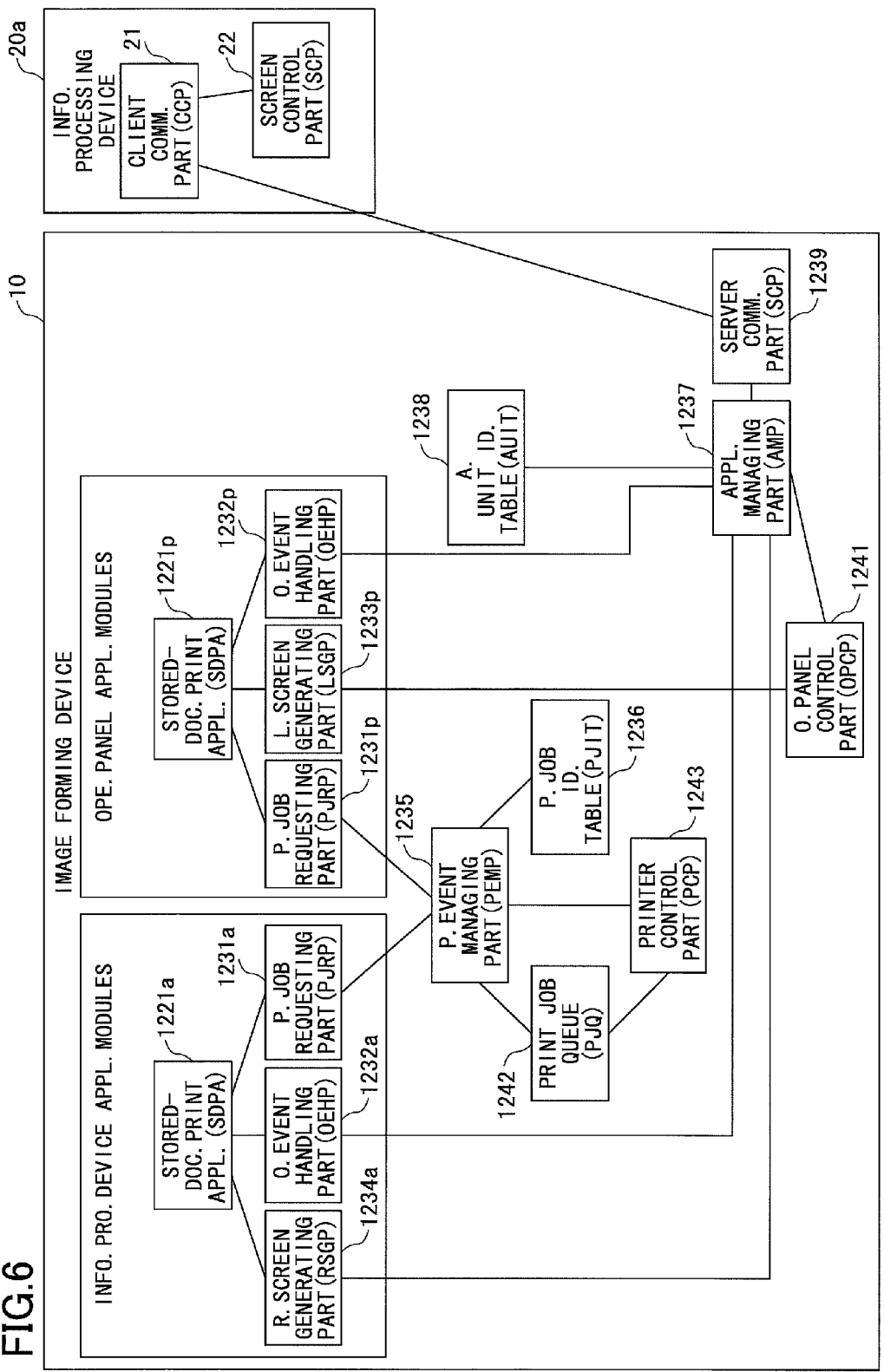
FIG. 6 is a diagram illustrating the situation in which the modules are loaded when execution of the stored-document print application is started by the information processing device and the operation panel simultaneously.

As a result of performing the procedure of FIG. 4, the situation of the modules loaded on the RAM 115 of the image forming device 10 is as illustrated in FIG. 6.

FIG. 6 illustrates the situation in which the modules are loaded when execution of the stored-document print application is started by the information processing device and the operation panel simultaneously.

As illustrated in FIG. 6, with respect to the information processing device 20*a*, the stored-document print application 1221*a*, the remote screen generating part 1234*a*, the operation event handling part 1232*a*, and the print job requesting part 1231*a* are loaded. These application programs loaded will be referred to "information processing device application modules". Moreover, with respect to the operation panel 15, the stored-document print application 1221*p*, the local screen generating part 1233*p*, the operation event handling part 1232*p*, and the print job requesting part 1231*p* are loaded. These application programs loaded will be referred to "operation panel application modules".

The print event managing part 1235, the print job queue 1242, the print job identification table 1236, the printer control part 1243, the operation panel control part 1241, the application managing part 1237, the application unit identification table 1238, and the server communication part 1239 are used by the information processing device application modules and the operation panel application modules in a shared manner.

Figure 7:
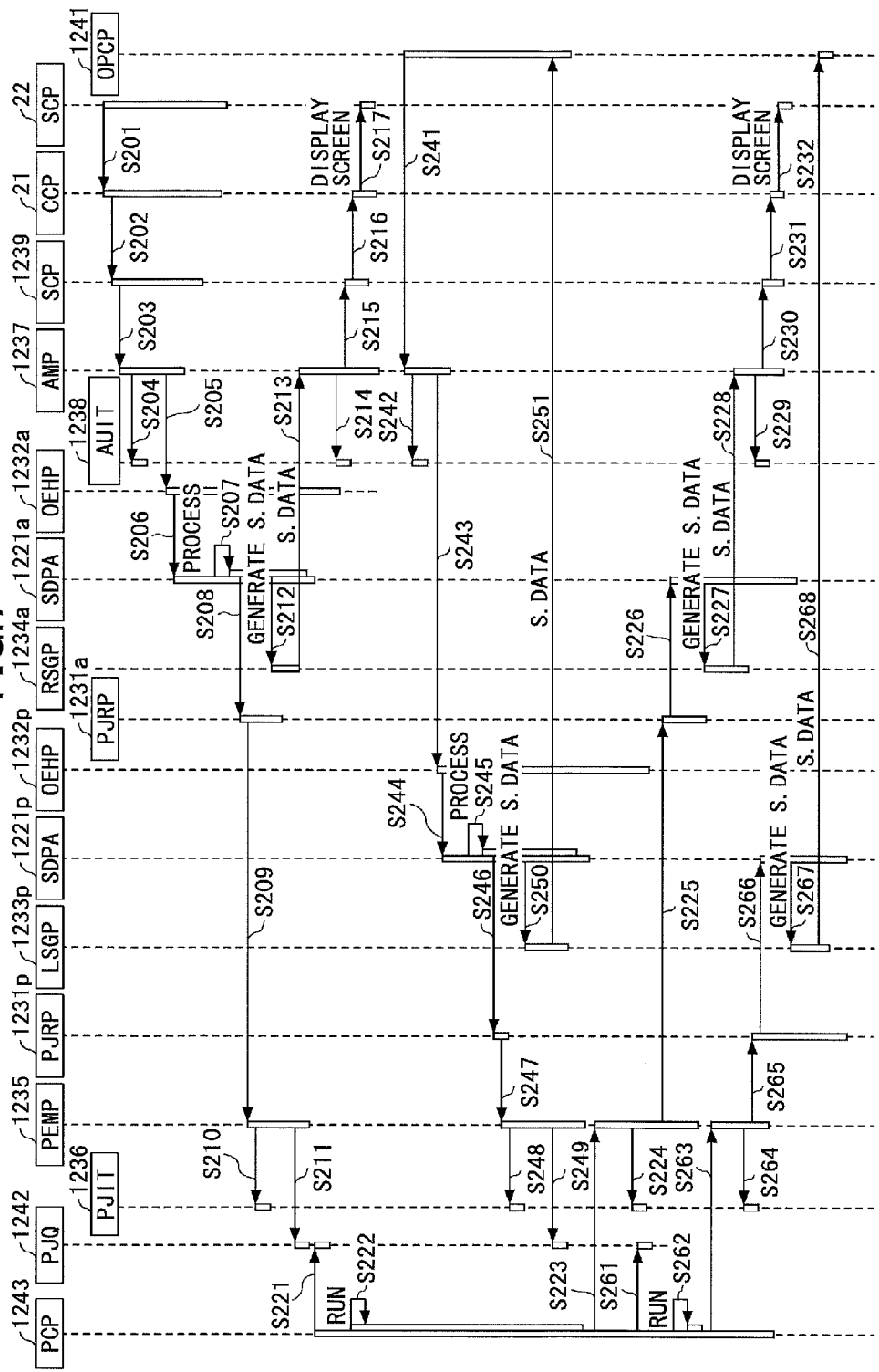
FIG. 7 is a sequence diagram for explaining the procedure performed by the image forming device when print jobs are executed by the stored-document print application through the operations of the information processing device and the operation panel.

Next, the procedure performed by the image forming device 10 in the situation illustrated in FIG. 6 when print jobs are performed by the stored-document print application 1221 will be described. FIG. 7 is a sequence diagram for explaining the procedure when print jobs are executed by the stored-document print application through the operations of the information processing device and the operation panel.

If the user A performs an input operation (depression of the button or selection of the element (line) in the list of image data elements) on the initial screen displayed on the display unit of the information processing device 20*a* after the step S115 in FIG. 4, the screen control part 22 notifies the client communication part 21 of an operation event corresponding to the input operation (S201). The operation event includes information containing an identifier of the drawing element corresponding to the operation (the depressed button or the element (line) selected from the list of screen data elements), a kind of the operation (depression or the like), an operation place identifier (identification information of the information processing device 20*a*), etc.

Subsequently, the client communication part 21 transmits the operation event to the server communication part 1239 of the image forming device 10 (S202). The server communication part 1239 notifies the application managing part 1237 of the received operation event (S203). The application managing part 1237 acquires the run unit identifier corresponding to the operation place identifier contained in the received operation event, from the application unit identification table 1238 (S204).

Subsequently, the application managing part 1237 notifies the operation event handling part 1232*a* of the operation event based on the acquired run unit identifier (S205). The operation event handling part 1232*a* notifies the operation event to the stored-document print application 1221 which is associated with the operation event handling part 1232*a* (S206).

Subsequently, the stored-document print application 1221*a* performs processing in accordance with the content of the operation event (S207). For example, if the content of the operation event indicates the selection of the element in the list of screen data elements, the identifier that identifies the selected element is stored in the memory 112. In this manner, the stored-document print application 1221*a* acquires the operation situations in the information processing device 20 (selection of the button, transitional changes in the screen, etc.).

When the content of the operation event indicates the depression of a start button (or a button for starting a print job), the stored-document print application 1221*a* designates the identifier of the image data element corresponding to the element selected from the list of image data elements, stored in the memory 112, and requests the print job requesting part 1231*a* to start execution of a print job (S208).

The print job requesting part 1231*a* determines a job ID of the print job with respect to the image data, and transmits to the print event managing part 1235 a request of execution of the print job and the identification information of the destination (which will be called "event notice recipient identifier") to which a notice of the print event related to the print job is output (S209). The image data to be printed is also transmitted to the print event managing part 1235.

In this embodiment, it is assumed that the event notice recipient identifier is the address information of the print job requesting part 1231. Hence, in the step S209, the address information of the print job requesting part 1231*a* is transmitted to the print event managing part 1235 as the event notice recipient identifier.

Subsequently, the print event managing part 1235 associates the job identified of the print job and the event notice recipient identifier of the print event and registers the same in the print job identification table 1236 (S210).

FIG. 8 illustrates the composition of a print job identification table 1236. As illustrated in FIG. 8, in the print job identification table 1236, an event notice recipient identifier and a job identifier are associated with each other and managed.

Subsequently, the print event managing part 1235 registers the print job in the print job queue 1242 (S211). Strictly speaking, the registration of a print job to the print job queue 1242 means registration of a request of execution of the print job in the print job queue 1242. The request of execution of the print job contains information required to perform the print job, which includes a job identifier, an identifier of the image data to be printed.

On the other hand, the stored-document print application 1221*a* transmits a request of generation of an in-print message screen to the remote screen generating part 1234*a* after the print job executing request is received (S212). The in-print message screen is, for example, a screen for displaying a message that indicates the printing is currently in progress.

The remote screen generating part 1234*a* generates the screen data of the in-print message screen, and requests the application managing part 1237 to transmit the generated screen data (S213). The application managing part 1237 acquires the operation place identifier corresponding to the run unit identifier concerning the source requesting acquisition of the screen data, from the application unit identification table 1238 (S214).

Subsequently, the application managing part 1237 designates the acquired operation place identifier and transmits a request of transmission of the screen data to the server communication part 1239 (S215). The server communication part 1239 transmits the screen data to the client communication part 21 of the information processing device 20*a* corresponding to the designated operation place identifier (S216). The client communication part 21 inputs the received screen data to the screen control part 22 (S217). The screen control part 22 displays an in-print message screen on the display unit of the information processing device 20*a* based on the received screen data.

On the other hand, the printer control part 1243 performs polling of the print job queue 1242 (S221). If it is detected that the print job is registered in the print job queue 1242, the printer control part 1243 performs the print job (S222). That is, the printer control part 1243 causes the printer 13 to perform printing of the image data with respect to the print job registered.

Subsequently, if the end of printing is detected, the printer control part 1243 notifies the print event managing part 1235 of a print event which indicates the end of printing (S223). The job ID of the corresponding print job is contained in the print event.

After the print event is received, the print event managing part 1235 acquires the event notice recipient identifier corresponding to the job ID contained in the received print event, from the print job identification table 1236 (S224).

Subsequently, the print event managing part 1235 notifies the print job requesting part 1231*a* of the print event based on the acquired print event notice recipient identifier (S225). The print job requesting part 1231*a* notifies the stored-document print application 1221*a* of the print event (S226).

Subsequently, the stored-document print application 1221*a* transmits a request of generation of the screen corresponding to the print event, to the remote screen generating part 1234*a* (S227). In this case, generation of a printing end screen which indicates the end of printing is requested.

Subsequently, the remote screen generating part 1234*a* generates the screen data of the printing end screen and transmits a request of transmission of the generated screen data to the application managing part 1237 (S228). The application managing part 1237 acquires the operation place identifier corresponding to the run unit identifier concerning the source requesting transmission of the screen data, from the application unit identification table 1238 (S228).

Subsequently, the application managing part 1237 designates the acquired operation place identifier and transmits a request transmission of the screen data to the server communication part 1239 (S229). The server communication part 1239 transmits the screen data to the client communication part 21 of the information processing device 20*a* corresponding to the designated operation place identifier (S230). The client communication part 21 inputs the received screen data to the screen control part 22 (S231). The screen control part 22 displays a printing end screen based on the received screen data. Even when a different print event other than the end of a print job (for example, lack of recording sheets) takes place, the same procedure as that of the steps S223-S232 in FIG. 7 is performed.

On the other hand, if the user B performs an input operation on the initial screen of the stored-document print application 1221*p* displayed on the operation panel 15, during execution of the print job requested from the information processing device 20*a*, the operation panel control part 1241 notifies the application communication part of an operation event corresponding to the input operation (S241). This operation event has a data format that is the same as that of the operation event from the screen control part 22 of the information processing device 20 (which contains the same information).

The application managing part 1237 acquires the run unit identifier corresponding to the operation place identifier contained in the received operation event, from the application unit identification table 1238 (S242).

Subsequently, the application managing part 1237 notifies the operation event to the operation event handling part 1232*p* based on the acquired run unit identifier (S243). The operation event handling part 1232*p* notifies the operation event to the stored-document print application 1221*p* which is associated with the operation event handling part 1232*p* (S244).

Subsequently, the stored-document print application 1221*p* performs processing according to the contents of the operation event (S245). For example, if the content of the operation event indicates selection of the element in the list of image data, the identifier of the selected element is stored in the memory 112. In this manner, the stored-document print application 1221*p* acquires the operation situations in the operation panel 15.

When the content of the operation event indicates the depression of a start button, the stored-document print application 1221*p* designates the identifier of the image data corresponding to the element selected from the list of image data element, stored in the memory 112, and requests the print job requesting part 1231*p* to start execution of a print job (S246).

The print job requesting part 1231*p* determines a job ID of the print job with respect to the image data, and transmits to the print event managing part 1235 a request of execution of the print job and the event notice recipient identifier with respect to the print job (S247). The image data to be printed is also transmitted to the print event managing part 1235. In the step S247, the address information of the print job requesting part 1231*p* is transmitted to the print event managing part 1235 as the event notice recipient identifier.

Subsequently, the print event managing part 1235 associates the job ID of the print job and the event notice recipient identifier of the print event, and registers the same in the print job identification table 1236 (S248).

Subsequently, the print event managing part 1235 registers the print job in the print job queue 1242 (S249).

On the other hand, the stored-document print application 1221*p* transmits a request of generation of an in-print message screen to the local screen generating part 1233*p* after the print job executing request is received (S250). The local screen generating part 1233*p* generates the screen data of the in-print message screen and transmits the screen data to the operation panel control part 1241 (S251). The operation panel control part 1241 displays an in-print message screen on the operation panel 15 based on the received screen data.

On the other hand, the printer control part 1243 performs polling of the print job queue 1242 (S261). If it is detected that the print job is registered in the print job queue 1242, the printer control part 1243 performs the print job (S262).

Subsequently, if the end of printing is detected, the printer control part 1243 notifies the print event managing part 1235 of a print event which indicates the end of printing (S263). The job ID of the corresponding print job is contained in the print event.

After the print event is received, the print event managing part 1235 acquires the event notice recipient identifier corresponding to the job ID contained in the received print event, from the print job identification table 1236 (S264).

Subsequently, the print event managing part 1235 notifies the print job requesting part 1231*p* of the print event based on the acquired event notice recipient identifier (S265). The print job requesting part 1231*p* notifies the stored-document print application 1221*p* of the print event (S266).

Subsequently, the stored-document print application 1221*p* transmits a request of generating of the screen according to the print event, to the local screen generating part 1233*p* (S267). In this case, generation of a printing end screen which indicates the end of printing is requested.

Subsequently, the local screen generating part 1233*p* generates the screen data of the printing end screen and transmits the screen data to the operation panel control part 1241 (S268). The operation panel control part 1241 displays a printing end screen on the operation panel 15 based on the received screen data.

As described above with respect to FIG. 7, in this embodiment, even when the operation through the operation panel 15 and the operation through the network are performed in parallel (or, even when the SDK application 1220 is used by two or more users simultaneously), the destination to which an operation event is transmitted and the destination to which a screen is output are determined appropriately. Determination of the destination of an operation event and determination of the destination of a screen are carried out by the SDK platform 1230, and it is not necessary for the SDK application 1220 to consider the destination of an operation event or the destination of a screen. Therefore, the developer of the SDK application 1220 is able to install the SDK application 1220 without considering a difference between the case in which the application is operated through the information processing device 20 and the case in which the application is operated through the operation panel 15.

In the procedure of FIG. 7, the exemplary case in which the same SDK application 1220 (the stored-document print application 1221) is used simultaneously is illustrated. However, the same procedure of FIG. 7 is also applicable to another case in which a first SDK application 1220 is used through the operation panel 15 and a second SDK application 1220 different from the first SDK application 1220 is used through the network.

Next, the ability of the simultaneous use of the SDK application 1220 by multiple users according to the image forming device 10 is also applicable to the case in which the SDK application 1220 is operated by multiple information processing devices 20 simultaneously.

For example, when the stored-document print application 1221 is used by two information processing devices 20*a* and 20*b*, the procedure of the steps S101-S115 in FIG. 4 is performed for each of the information processing devices 20*a* and 20*b*. As a result, the situation in which the modules are loaded in the image forming device 10 is as illustrated in FIG. 9.

Figure 9:
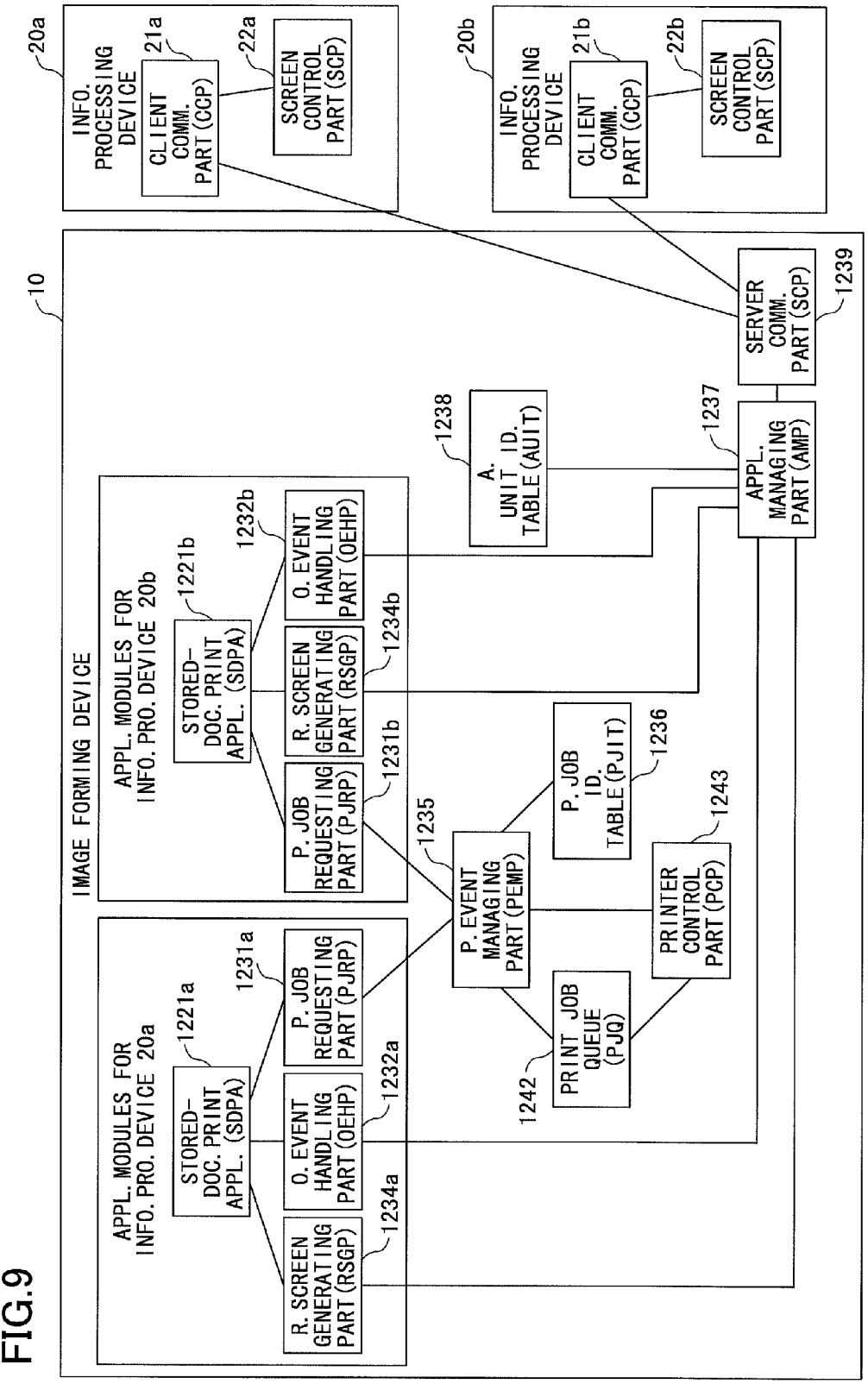
FIG. 9 is a diagram illustrating the situation in which the modules are loaded when execution of the stored-document print application is started by two information processing devices simultaneously.

FIG. 9 illustrates the situation in which the modules are loaded when execution of the stored-document print application is started by the two information processing devices simultaneously.

As illustrated in FIG. 9, with respect to the information processing device 20*a*, the stored-document print application 1221*a*, the remote screen generating part 1234*a*, the operation event handling part 1232*a*, and the print job requesting part 1231*a* are loaded. With respect to the information processing device 20*b*, the stored-document print application 1221*b*, the remote screen generating part 1234*b*, the operation event handling part 1232*b*, and the print job requesting part 1231*b* are loaded. In FIG. 9, other elements which are the same as corresponding elements in FIG. 6 are designated by the same reference numerals, and a description thereof will be omitted. For the sake of convenience, in FIG. 9, illustration of the operation panel control part 1241 is omitted.

Figure 10:
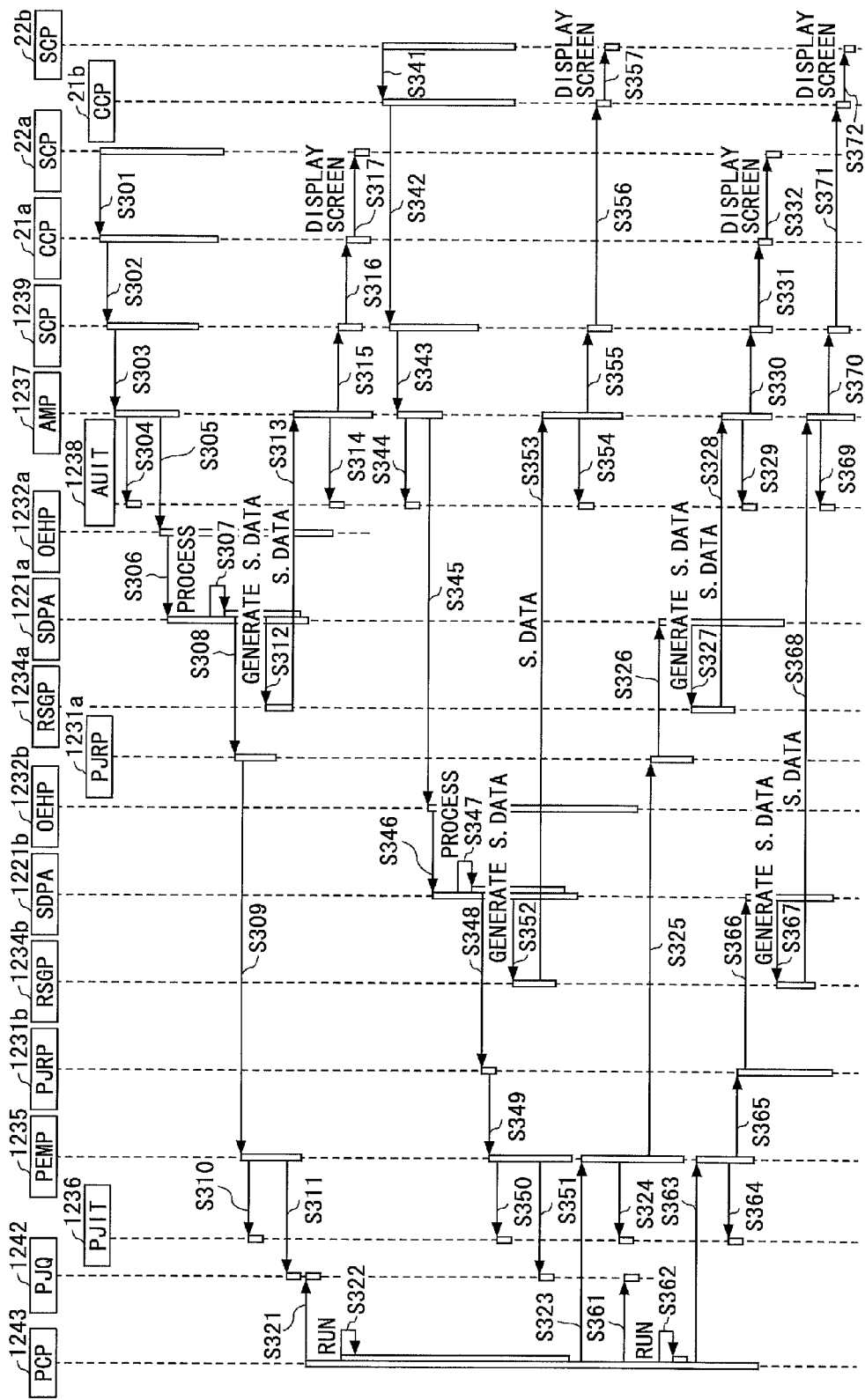
FIG. 10 is a sequence diagram for explaining the procedure performed by the image forming device when print jobs are executed by the stored-document print application through the operations of the two information processing devices.

FIG. 10 is a sequence diagram for explaining the procedure performed by the image forming device 10 when print jobs are executed by the stored-document print application through the operations of the two information processing devices. In other words, the procedure illustrated in FIG. 10 is performed by the image forming device 10 when the print jobs are executed by the stored-document print application 1221 in the situation illustrated in FIG. 9.

The procedure of steps S301-S372 in FIG. 10 is similar to the procedure of the steps S201-S232 in FIG. 7 described above. That is, the procedure of steps S301-S332 in FIG. 10 is performed with respect to the information processing device 20*a*, and the procedure of steps S341-S372 in FIG. 10 is performed with respect to the information processing device 20*b*.

As illustrated in FIG. 10, the image forming device 10 of this embodiment is arranged so that the destination to which a notification of an operation event is transmitted, the destination to which the screen data is output, etc. are determined appropriately even when the image forming device 10 is used through the network by two or more information processing devices 20.

The procedure for the case in which the stored-document print application 1221 is used by the operation panel 15 and two or more information processing devices 20 simultaneously is self-explanatory from a combination of the procedures in FIG. 7 and FIG. 10, and a description thereof will be omitted.

In this embodiment, the run unit identification information is used for two or more purposes, such as determination of the destination to which a notification of an operation event is transmitted, determination of the destination to which the screen data is output, etc. Specifically, at the step S204 in FIG. 7, the run unit identification information is used as identification information for identifying the operation event handling part 1232 which makes notification of an operation event. At the step S214 in FIG. 7, the run unit identification information is used as identification information for identifying the remote screen generating part 1234 which is the source requesting transmission of the generated screen data.

For example, when it is difficult to identify the operation event handling part 1232 or the remote screen generating part 1234 based on one identification information item due to the restrictions on the specifications of the programming language or the like, using two or more identification information items to define the run unit identification information is also possible.

Specifically, at the step S110 in FIG. 4, the application managing part 1237 may be arranged to register in the application unit identification table 1238 the respective identifiers of the remote screen generating part 1234*a* and the operation event handling part 1232*a* as the run unit identification information items. Similarly, at the step S129 in FIG. 4, the application managing part 1237 may be arranged to register in the application unit identification table 1238 the respective identifiers of the local screen generating part 1233*b* and the operation event handling part 1232*b* as the run unit identification information items.

In this embodiment, the example in which the operation place identifier is associated with each run unit of the SDK application 1220 in the application unit identification table 1238 has been described. However, in the environment in which the simultaneous use of a same SDK application 1220 should be inhibited, or in the environment which is guaranteed that the same SDK application 1220 is never used simultaneously, the operation place identifier may be associated with each kind of the SDK application 1220 (or each application ID) in the application unit identification table 1238.

The entries in the application unit identification table 1238 are deleted when execution of a corresponding run unit is terminated. Similarly, the entries of the print job identification table 1236 are deleted when execution of a corresponding print job is terminated.

According to the present disclosure, the influences on the installation of the application by the difference of the operation place can be reduced.

The present disclosure is not limited to the specifically disclosed embodiments, and variations and modifications may be made without departing from the scope of the present disclosure.

The present application is based on Japanese patent application No. 2009-150818, filed on Jun. 25, 2009, the contents of which are incorporated herein by reference in their entirety.

What is claimed is:

1. An information processing system comprising:
a device that executes a job based on an execution request for requesting to execute an application; and
an information processing device that functions as an operation part for operating the device and is connected to the device,
wherein the device includes
a screen generating part configured to generate screen data to be displayed on the information processing device and to transmit the screen data to the information processing device to cause the screen data to be displayed on the operation part of the information processing device; and
an application managing part configured
to control, in response to the execution request input from the operation part of the information processing device, the screen data or the execution request based on correspondence information that associates sources inputting the execution request with the application and includes information associating an identifier of a run unit of the application and an identifier of an operation place where the execution request is input,
to store the correspondence information in a memory unit,
to determine, in response to an operation event input from the operation part of the information processing device, the application corresponding to one of the sources inputting the operation event based on the stored correspondence information, and
to notify the determined application of the operation event.

2. The information processing system according to claim 1, wherein the execution request in the correspondence information relates to printing.

3. The information processing system according to claim 1, wherein the correspondence information associates the information of sources inputting the execution request with run units of the application.

4. The information processing system according to claim 1, wherein the application managing part controls, in response to the execution request input from the operation part of the information processing device, the screen data or the execution request based on correspondence information associating sources inputting the execution request with the application using a common interface.

5. The information processing system according to claim 1,
wherein the device is an image forming device,
wherein if an event input into the image forming device is an image processing event, image processing is controlled by the application managing part of the image forming device in response to the execution request, and
if the event input into the image forming device is the execution request, the screen data to be displayed on the information processing device are switched based on the correspondence information.

6. The information processing system according to claim 1,
wherein the correspondence information stored in the memory unit of the application managing part associates the information of sources inputting the execution request with run units of the application, and
wherein the application managing part determines, in response to an operation event input from the operation part of the information processing device, one of the run units of the application corresponding to one of the sources inputting the operation event based on the stored correspondence information.

7. A method of processing information in an information processing system including
a device that executes a job based on an execution request for requesting to execute an application, and
an information processing device that functions as an operation part for operating the device and is connected to the device,
the method comprising:
generating, by a screen generating part of the device, screen data to be displayed on the information processing device and transmitting the screen data to the information processing device to cause the screen data to be displayed on the operation part of the information processing device; and
controlling, by an application managing part of the device, in response to the execution request input from the operation part of the information processing device, the screen data or the execution request based on correspondence information associating that associates sources inputting the execution request with the application and includes information associating an identifier of a run unit of the application and an identifier of an operation place where the execution request is input,
storing, by the application managing part, the correspondence information in a memory unit,
determining, by the application managing part, in response to an operation event input from the operation part of the information processing device, the application corresponding to one of the sources inputting the operation event based on the stored correspondence information, and
notifying, by the application managing part, the determined application of the operation event.

8. The method according to claim 7,
wherein the execution request in the correspondence information relates to printing.

9. The method according to claim 7,
wherein the correspondence information associates the information of sources inputting the execution request with run units of the application.

10. The method according to claim 7,
wherein the controlling, by the application managing part, is performed, in response to the execution request input from the operation part of the information processing device, the screen data or the execution request based on correspondence information associating sources inputting the execution request with the application using a common interface.

11. The method according to claim 7,
wherein the device is an image forming device,
wherein if an event input into the image forming device is an image processing event, image processing is controlled by the application managing part of the image forming device in response to the execution request, and
if the event input into the image forming device is the execution request, the screen data to be displayed on the information processing device are switched based on the correspondence information.

12. The information processing system according to claim 7,
wherein the correspondence information stored in the memory unit of the application managing part associates the information of sources inputting the execution request with run units of the application, and
wherein the application managing part determines, in response to an operation event input from the operation part of the information processing device, one of the run units of the application corresponding to one of the sources inputting the operation event based on the stored correspondence information.

13. A device that executes a job based on an execution request for requesting to execute an application, the device comprising:
a screen generating part configured to generate screen data to be displayed on an information processing device that functions as an operation part for operating the device and is connected to the device and to transmit the screen data to the information processing device to cause the screen data to be displayed on the operation part of the information processing device; and
an application managing part configured
to control, in response to the execution request input from the operation part of the information processing device, the screen data or the execution request based on correspondence information that associates sources inputting the execution request with the application and includes information associating an identifier of a run unit of the application and an identifier of an operation place where the execution request is input,
to store the correspondence information in a memory unit,
to determine, in response to an operation event input from the operation part of the information processing device, the application corresponding to one of the sources inputting the operation event based on the stored correspondence information, and
to notify the determined application of the operation event.

14. The device according to claim 13,
wherein the execution request in the correspondence information relates to printing.

15. The device according to claim 13,
wherein the correspondence information associates the information of sources inputting the execution request with run units of the application.

16. The device according to claim 13,
wherein the application managing part controls, in response to the execution request input from the operation part of the information processing device, the screen data or the execution request based on correspondence information associating sources inputting the execution request with the application using a common interface.

17. The device according to claim 13,
wherein the device is an image forming device,
wherein if an event input into the image forming device is an image processing event, image processing is controlled by the application managing part of the image forming device in response to the execution request, and
if the event input into the image forming device is the execution request, the screen data to be displayed on the information processing device are switched based on the correspondence information.

* * * * *